United States Patent [19]

Shimo

[11] Patent Number: 4,746,228

[45] Date of Patent: May 24, 1988

[54] LINEAR MOTION ROLLING CONTRACT BEARING ASSEMBLY USING A ROLLER HAVING A TRUNCATED DOME END

[75] Inventor: Takahiro Shimo, Chigasaki, Japan

[73] Assignee: Nippon Thompson Co., Ltd., Japan

[21] Appl. No.: 947,774

[22] Filed: Dec. 30, 1986

[30] Foreign Application Priority Data

Dec. 30, 1985 [JP] Japan .................... 60-298359

[51] Int. Cl.$^4$ ............................ F16C 29/06
[52] U.S. Cl. ..................... 384/44; 384/47
[58] Field of Search ............ 384/44, 47, 43; 464/168

[56] References Cited

U.S. PATENT DOCUMENTS

| | | | |
|---|---|---|---|
| 3,466,101 | 9/1969 | Hudson | 384/44 |
| 4,215,904 | 8/1980 | Teramachi | 384/47 |
| 4,544,211 | 10/1985 | Kwon et al. | 384/44 |
| 4,556,262 | 12/1985 | Geka | 384/44 |

Primary Examiner—Lenard A. Footland
Attorney, Agent, or Firm—Thomas S. MacDonald; Alan H. MacPherson; Paul J. Winters

[57] ABSTRACT

A linear motion rolling contact bearing assembly includes a rail, a slider subassembly slidably mounted on the rail and provided with an endless circulating path, and a plurality of AF-F rollers provided in the endless circulating path. Each of the AF-F rollers is generally cylindrical in shape and has a flat end surface at one end and a truncated dome-shaped end surface at the opposite end. The endless circulating path includes a pair of straight load and return sections and a pair of curved connecting sections each connecting the corresponding ends of the load and return sections. Preferably, the curved connecting section has a pair of outer guide surfaces each of which has a radius of curvature which is equal to or slightly larger than the radius of curvature defining the dome-shaped portion of each of the rollers.

8 Claims, 4 Drawing Sheets

LINEAR MOTION ROLLING CONTRACT BEARING ASSEMBLY USING A ROLLER HAVING A TRUNCATED DOME END

BACKGROUND OF THE INVENTION

1. Field of the Invention

This invention generally relates to a bearing assembly for providing a linear relative motion between two elements, and, in particular, to a linear motion rolling contact bearing assembly employing a plurality of rollers in an endless circulating path.

2. Description of the Prior Art

A linear motion rolling contact bearing assembly for providing a linear relative motion between two elements is well known in the art. Typically, such a linear motion bearing assembly includes a rail extending straight over a desired distance, theoretically over an indefinite length, and a casing or slider which moves along the rail. An endless circulating path is defined in the slider and partly between the slider and the rail, and a plurality of rollers are provided in the endless circulating path, thereby providing a rolling contact between the slider and the rail. Typically, the endless circulating path has a cross section generally square in shape and the rollers are arranged with their axes oriented perpendicular to each other alternately. The endless circulating path includes a pair of straight load and return sections and a pair of circular connecting sections, each connecting the corresponding ends of the load and return sections. The straight load section is normally defined between the rail and the slider and the straight return section is defined within the slider.

In such a linear motion rolling contact bearing assembly, in order to improve the smoothness in movement of the rollers in particular through each of the circular connecting sections of the endless circulating path, it has been proposed to use rollers each of which is generally cylindrical in shape and has a pair of end surfaces, one of which is flat and the other of which is arcuate or dome-shaped, as disclosed in the Japanese Utility Model Application No. 60-19057, which is hereby incorporated by reference. For the sake of convenience, the flat end surface of this cylindrical roller will be referred to as an F end surface and the arcuate or dome-shaped end surface of the cylindrical roller will be referred to as an A end surface. Thus, a cylindrical roller having a flat end surface and an arcuate or dome-shaped end surface will be referred to as an A-F roller. In accordance with the teachings of the above-identified Japanese Utility Model Application No. 60-19057, A-F rollers are arranged in the endless circulating path such that the A-F rollers rollingly move along each of the circular connecting portions with their A end surfaces oriented radially outwardly and their F end surfaces oriented radially inwardly.

It is true that the arrangement disclosed in the above-identified Japanese Utility Model Application No. 60-19057 improves the smoothness in the sliding movement of the rollers especially through each of the curved connecting portions of the endless circulating path. However, because of tolerances in providing an arcuate or dome-shaped roller, the height could differ from roller to roller when manufactured, and this could increase the sliding resistance of the A-F rollers against their rolling movement along the endless circulating path. Since the rollers are different in height, shorter rollers tend to skew between the two adjacent longer rollers, which could cause an increase in the sliding resistance and instability in operation.

SUMMARY OF THE INVENTION

In accordance with the principle of the present invention, there is provided a linear motion rolling contact bearing assembly which comprises a rail extending straight over a desired length. In the preferred embodiment, the rail has a pair of opposite side walls each of which is provided with a V-shaped guide groove extending in parallel with the longitudinal direction of the rail. The assembly also includes an endless circulating path partly defined in the slider and partly defined between the slider and the rail. The endless circulating path includes straight load and return sections, which extend in parallel, and a pair of curved connecting sections each of which is connected to the corresponding ends of the load and return sections. The slider is also provided with a V-shaped groove which is located opposite to the corresponding one of the V-shaped grooves of the rail when assembled, and this pair of oppositely located V-shaped grooves defines the straight load path between the rail and the slider. Thus, the load section has a generally square cross sectional shape. Similarly, the return and curved connecting sections have a generally square cross sectional shape. It is to be noted that a pair of such endless circulating paths is provided in the present assembly one on each side of the rail.

The present assembly also comprises a plurality of rollers which are provided in each of the endless circulating paths. Each of the rollers is generally cylindrical in shape and has one end surface which is flat and the other end surface which has a truncated dome shape. The truncated dome shape is defined by first forming an arcuate or dome shape at one end of a roller and the arcuate or dome-shaped end is truncated to provide a flat tip end. Thus, such a roller having a flat end surface and a truncated dome-shaped end surface will be referred to as an AF-F roller. In the preferred embodiment, the AF-F rollers are provided in the endless circulating path in a crossed arrangement, i.e., the two adjacent AF-F rollers being arranged with their rotating axes extending perpendicular to each other. Preferably, the radius of curvature of each of the curved connecting section of the endless circulating path is set substantially equal to or larger than the radius of curvature of the truncated dome end of the AF-F roller.

It is therefore a primary object of the present invention to obviate the disadvantages of the prior art as described above and to provide an improved linear motion rolling contact bearing assembly.

Another object of the present invention is to provide an improved linear motion rolling contact bearing assembly extremely low in sliding resistance and high in stability.

A further object of the present invention is to provide an improved linear motion rolling contact bearing assembly simple in structure and thus easy and inexpensive to manufacture.

Other objects, advantages and novel features of the present invention will become apparent from the following detailed description of the invention when considered in conjunction with the accompanying drawings.

DESCRIPTION OF THE PREFERRED EMBODIMENTS

Figure 1:
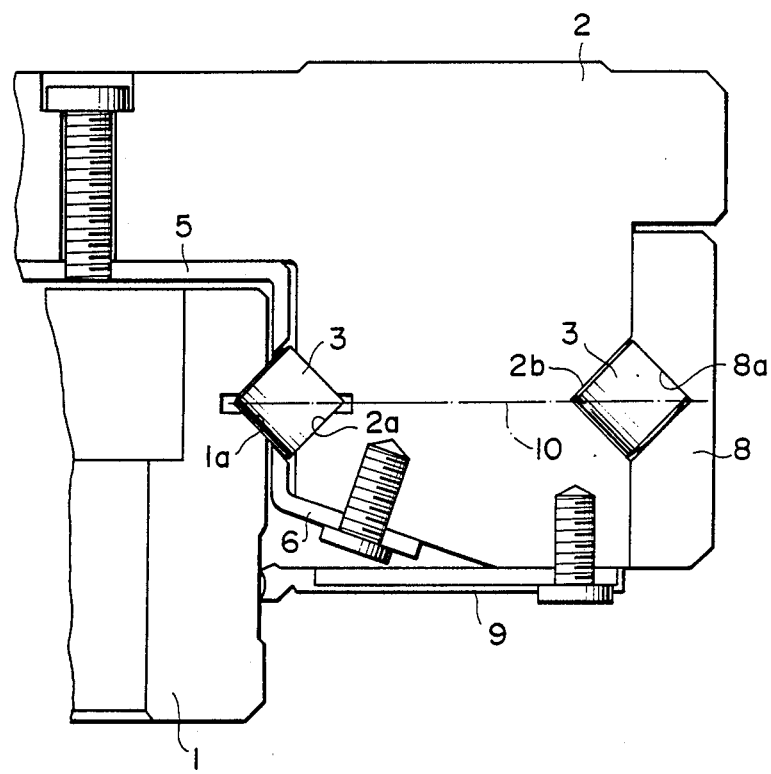
FIG. 1 is a partial, transverse, cross sectional view showing a linear motion rolling contact bearing assembly constructed in accordance with one embodiment of the present invention.

Referring now to FIG. 1, there is shown in transverse cross section a linear motion rolling contact bearing assembly constructed in accordance with one embodiment of the present invention. It is to be noted that, since the present bearing assembly is symmetrical with respect to its longitudinal center line, only the right-hand half of the entire structure in transverse cross section is shown in FIG. 1. As shown, the present bearing assembly includes a rail 1 which extends straight over a desired length, e.g., indefinitely theoretically, if desired. The rail 1 has a pair of opposite side walls which extend in parallel from each other and also with respect to the longitudinal direction of the rail 1. The side walls are upright in the illustrated embodiment, and each of the side walls is provided with a V-shaped guide groove 1a. As will be described more in detail later, this guide groove 1a forms part of a load section which in turn constitutes part of an endless circulating path.

The present bearing assembly also includes a casing or slider 2 which has a generally inverted-U shaped cross section and thus the slider 2 is provided to straddle the rail 1 when assembled as shown in FIG. 1. Thus, the slider 2 has a horizontal portion and a pair of vertically depending portions each of which extend downwardly from the corresponding side of the horizontal portion. The vertical portions of the slider 2 are thus located on the opposite sides of the rail 1 when assembled.

As will become clear later, the present bearing assembly also includes an endless circulating path which is partly formed in the slider 2 and partly between the slider 2 and the rail 1. The endless circulating path includes a pair of straight load and return sections and a pair of curved connecting sections each connecting the corresponding ends of the load and return sections. The slider 2 is also provided with an outer guide groove 2a having a V-shaped cross section and located opposite to the corresponding inner guide groove 1a, so that the load section of the endless circulating path is defined by a pair of oppositely located inner and outer guide grooves 1a and 2a. The slider 2 is also provided with another V-shaped guide groove 2b which extends in parallel with the V-shaped guide groove 2a. A side cover 8 provided with a V-shaped guide groove 8a is fixedly attached to the corresponding side of the slider 2 by means of bolts. Thus, the pair of guide grooves 2b and 8a defines the return section of the endless circulating path, which is generally square in cross section.

In addition, a pair of end blocks 4, 4 is provided and each of the end blocks 4, 4 is fixedly attached to the corresponding one of the front and rear ends of the slider 2. Each of the end blocks 4, 4 is formed with a curved connecting section of the endless circulating path, which connects the load and return sections to define the endless circulating path. Since the end blocks 4, 4 and the side covers 8, 8 are fixedly attached to the slider 2, the return and curved connecting sections of the endless circulating path are defined in the slider 2 and only the load section is defined between the rail 1 and the slider 2. In the present embodiment, the return section is located such that the load and return sections have a common diagonal line, and, thus, a plane defined by the diagonal line common to the load and return sections is a horizontal plane.

Figure 3A:
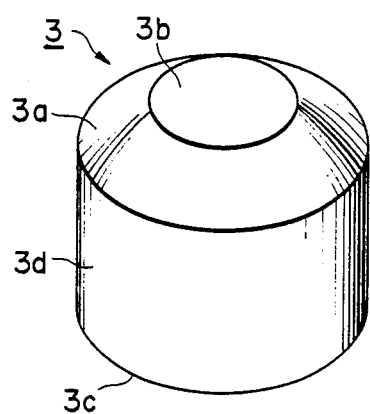
FIG. 3a is a perspective view showing the overall structure of an AF-F roller to be used in the present bearing assembly shown in FIGS. 1 and 2.
Figure 3B:
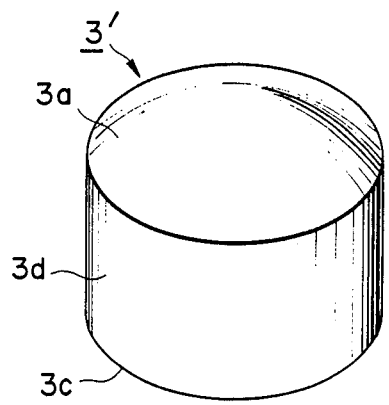
FIG. 3b is a perspective view showing the overall structure of a conventional A-F roller.

A plurality of rollers 3 are provided in each of the endless circulating paths. The rollers 3 are generally cylindrical in shape and they are arranged in the endless circulating path in the so-called crossed arrangement, i.e., any two adjacent rollers being arranged with their rotating axes oriented perpendicular to each other. More importantly, each of the rollers 3 has a particular shape as shown in FIG. 3a. That is, the roller 3 is generally cylindrical in shape and it has a truncated dome-shaped end surface 3a and a flat tip end surface 3b, which is defined by truncation of the domed-shaped end surface, at one end, and a flat end surface 3c. Both of the tip end surface 3b and the flat bottom end surface 3c are in parallel and are normal to the longitudinal or rotating center line of the roller 3. The top surface in the shape of a truncated dome shape is referred to as an AF end surface and the bottom flat surface will be referred to as an F end surface. Thus, the roller 3 having the shape as shown in FIG. 3a is referred to as an AF-F roller. As a comparison, a typical prior art A-F roller is shown in FIG. 3b. That is, the A-F roller 3' shown in FIG. 3b is similar to the roller shown in FIG. 3a excepting the fact that the top dome-shaped end surface is not truncated in the prior art structure. As described previously, the manufacturing of such a dome shape at high precision is relatively difficult and the height determined by the tip end of the dome surface 3a and the bottom flat surface 3c tends to fluctuate from roller to roller due to manufacturing tolerances. On the other hand, in the case of the present roller 3 shown in FIG. 3a, the height of each of the rollers 3 can be determined at high precision because the tip end of the dome surface 3a is truncated to define a tip flat end surface 3b. Thus, the use of the AF-F roller 3 shown in FIG. 3a allows to enhance the smoothness of the roller 3 during movement along the endless circulating path, in particular the curved connecting section thereof.

Figure 4:
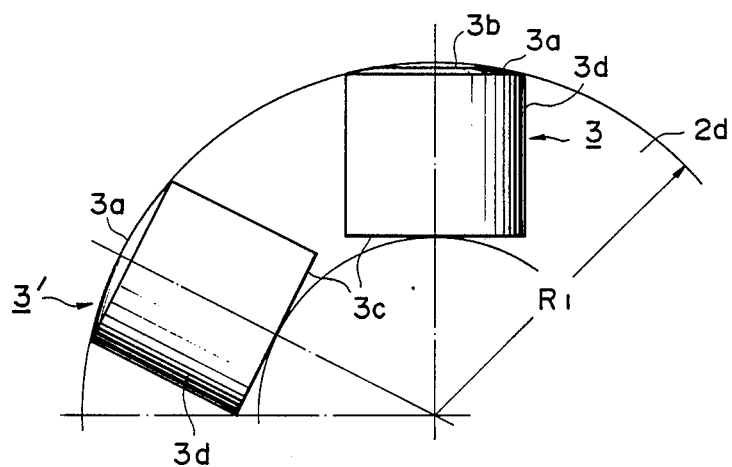
FIG. 4 is a schematic illustration which is useful for understanding the advantages of the present invention using an AF-F roller over the prior art using an A-F roller in the curved connecting section of an endless circulating path.

The AF-F rollers 3 are arranged in the endless circulating path such that their AF end surfaces are directed outwardly and their F end surfaces are directed inwardly with respect to the endless circulating motion of the rollers 3. Described more in detail in this respect with reference to FIG. 4, the AF-F rollers 3 are arranged in the endless circulating path such that their AF end surfaces slide along the outer guide surface of the curved connecting section 2d; on the other hand, the F end surface of the roller 3 slides along the inner guide surface of the curved connecting section 2d. In FIG. 4, not only the AF-F roller 3 according to the present invention, but also the A-F roller 3' according to the prior art are shown in the curved connecting section 2d of the endless circulating path. As shown in FIG. 4, the illustrated curved connecting section has a radius of curvature $R_1$ for defining the outer guide surface of the curved connecting section 2d. It is to be noted that there is, in fact, a pair of such outer guide surfaces and a pair of such inner guide surfaces to define the curved connecting section 2d which has a generally square cross section. Preferably, the arcuate or dome end surface 3a of the roller 3 has a radius of curvature which is substantially equal to or slightly smaller than the radius of curvature $R_1$. It will be easily appreciated that fluctuations in height between the tip end of the dome or A end surface 3a and the F end surface 3c can be completely eliminated by providing the tip end surface 3b or providing a truncated dome end surface.

Returning to FIGS. 1 and 2, the slider 2 is also provided with a pair of top and bottom roller retainer plates 5 and 6 as fixedly attached thereto. The top retainer plate 5 is generally in the shape of an inverted U and it is fixedly attached to the slider 2 by means of bolts. As best seen from FIG. 1, the top retainer plate 5 has a slanted edge which may engage with the rollers 3 at their AF end surfaces 3a–3b and peripheral sides 3d alternately. The bottom retainer plate 6 is also fixedly attached to the slider 6 by means of bolts and it also has a slanted edge which may engage with the rollers 3 at their AF end surfaces 3a–3b and peripheral sides 3d alternately. With the provision of these top and bottom retainers 5 and 6, the rollers 3 are prevented from falling away from the endless circulating path. Thus, even if the slider 2 is disassembled and separated away from the rail 1, the rollers 3 are properly retained in the endless circulating path. Such a structure is particularly advantageous because it will ease the maintenance operation significantly. Also provided in the present assembly is a bottom seal plate 9 which is fixedly attached to the bottom of the slider 2 by means of bolts to cover the bottom thereof.

Figure 2:
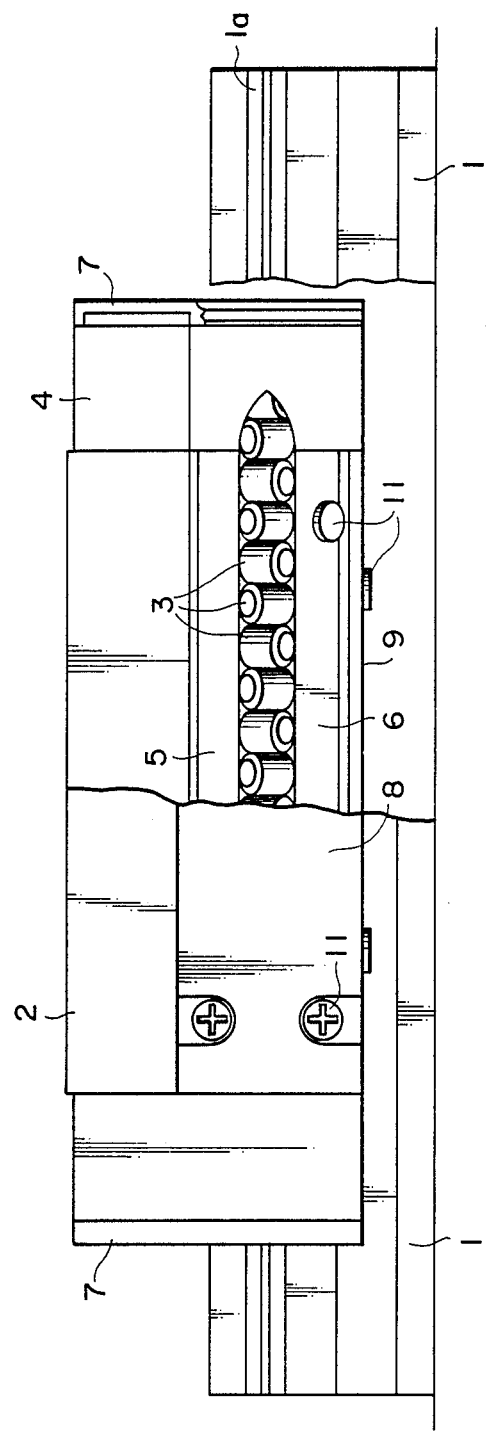
FIG. 2 is a partly broken away, side elevational view of the bearing assembly shown in FIG. 1.

Furthermore, as shown in FIG. 2, the side cover 8 is fixedly attached to the slider 2 by means of bolts 11, and a pair of end surface seal plates 7, 7 is fixedly attached to the end blocks 4, 4 which in turn are fixedly attached to the end surfaces of the slider 2.

Figure 5:
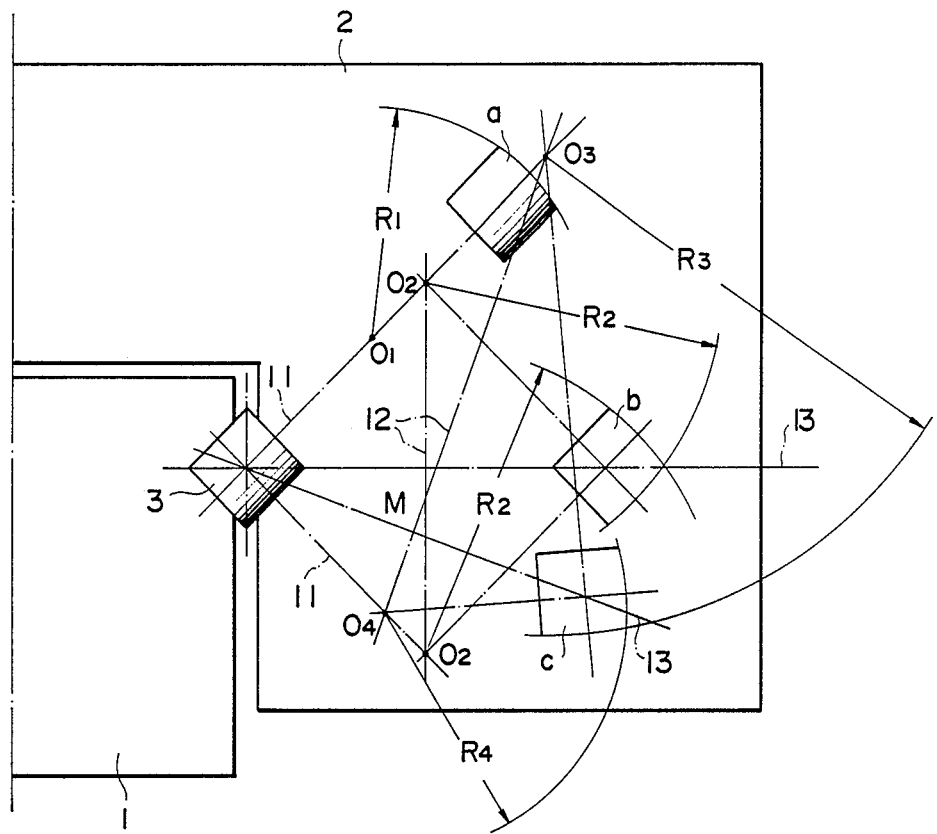
FIG. 5 is a schematic illustration showing three typical examples of the endless circulating path to be formed in the slider.

FIG. 5 shows several methods of defining the endless circulating path in the slider 2. There are shown three typical examples, in any of which the endless circulating path has a generally square cross section in commensurate with the cross section of the AF-F roller 3 and each of the pair of outer guide surfaces of the curved connecting section 2d has a radius of curvature which is substantially equal to or slightly larger than the radius of curvature defining a curved portion of the AF end surface. These three examples shown in FIG. 5 mainly differ in the location of the return section.

In the first example, the return section is located at top right so that the rotating axes of the rollers 3 in the load section and the rotating axes of the rollers 3 in the return section lie in the same plane. Each of the pair of outer guide surfaces of the curved connecting section of the endless circulating path in this case will be defined to have the radius of curvature $R_1$. And, thus, the arcuate section of the AF end surface of each of the rollers 3 is defined to have this radius of curvature $R_1$. In the second example, the load and return sections are located horizontally as indicated by b. Thus, the load and return sections in this case have a common diagonal plane. In this case, each of the pair of outer guide surfaces of the curved connecting section is defined to have a radius of curvature $R_2$, and, thus, the arcuate portion of the AF end surface of each of the rollers 3 is defined to have this radius of curvature $R_2$. The third example is to locate the return section somewhere between the first and second examples as indicated by c. In this case, the pair of outer guide surfaces of the curved connecting section have different radii of curvature $R_3$ and $R_4$, respectively. Thus, the rollers 3 should include two different AF-F rollers having two different AF end surfaces or the arcuate portions thereof. In this case, however, in practice, only those AF-F rollers 3 having the smaller radius of curvature, $R_3$ or $R_4$, can be used, which is advantageous because there is no need to provide two different AF-F rollers.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion rolling contact bearing assembly comprising:
   a rail extending straight over a desired length and provided with at least one first guide groove;
   a slider subassembly mounted on said rail so as to provide a relative linear motion therebetween, said slider subassembly being provided with at least one endless circulating path, part of which is defined by said first guide groove; and
   a plurality of rollers provided in said endless circulating path, each of said rollers being generally cylindrical in shape and having a flat end surface at a first end and a truncated dome-shaped end surface at a second end which is opposite to said first end.

2. The assembly of claim 1 wherein said endless circulating path includes a pair of straight load and return sections and a pair of curved connecting sections each of which connects the corresponding ends of said load and return sections.

3. The assembly of claim 2 wherein said endless circulating path has a generally square cross section which is substantially equal to the cross section of said rollers.

4. The assembly of claim 3 wherein said first guide groove has a V-shaped cross section and said slider subassembly includes a second guide groove located opposite to said first guide groove of said rail, thereby defining said load section square in cross section, whereby those rollers located in said load section provide a rolling contact between said rail and said slider subassembly.

5. The assembly of claim 3 wherein each of said curved connecting sections has a pair of outer guide surfaces which define a V-shaped cross section and each of which has a radius of curvature which is substantially equal to or larger than a radius of curvature defining the dome-shaped portion of each of said rollers.

6. The assembly of claim 3 wherein said rollers are arranged in said endless circulating path such that any two adjacent rollers are in contact and arranged with their rotating axes extending perpendicular to each other.

7. The assembly of claim 2 further comprising retaining means for retaining those of said rollers that are located in said load section to be in said load section even if said slider subassembly is separated away from said rail.

8. The assembly of claim 7 wherein said retaining means includes a pair of top and bottom retainer plates which are provided with slanted edges to retain said rollers in said load section.

* * * * *